United States Patent [19]
Keese

[11] Patent Number: 5,537,283
[45] Date of Patent: Jul. 16, 1996

[54] GROUND FAULT DETECTION CIRCUIT FOR AN UNGROUNDED CONTROL SYSTEM

[76] Inventor: Brendan T. Keese, 5008 N. Shoreland Ave., Whitefish Bay, Wis. 53217

[21] Appl. No.: 420,181

[22] Filed: Apr. 11, 1995

[51] Int. Cl.⁶ ............................................. H02H 3/00
[52] U.S. Cl. ...................... 361/42; 361/35; 361/38; 361/49
[58] Field of Search .................. 361/35–36, 38, 361/42, 45–46, 49–50, 47

[56] References Cited

U.S. PATENT DOCUMENTS

| | | | |
|---|---|---|---|
| 3,678,338 | 9/1972 | Beachley | 361/47 |
| 3,840,783 | 10/1974 | Eckart | 361/47 |

*Primary Examiner*—Jeffrey A. Gaffin
*Assistant Examiner*—Michael J. Sherry
*Attorney, Agent, or Firm*—Larry I. Golden; Michael J. Femal; Richard J. Graefe

[57] ABSTRACT

A ground fault detection circuit monitors an interlock control circuit for use with a machine or process control system. The interlock control system utilizes electromechanical relays with hard contacts. The interlock control system will disable operation of the machine or process if any ground fault condition exists in the interlock control circuit. A ground condition in the machine or process control circuits is permissible. The system uses a redundant circuit path to verify the integrity of the components in the interlock control system. The control system includes an ungrounded isolation transformer for supplying power to separate monitoring relays interposed between each leg of the transformer and ground. The contacts of these relays are series connected with emergency-stop (e-stop) switches to energize interposing control relays. The outputs of the interposing relays are used to energize the final control relay that controls the operation of the machine or process. If a ground fault occurs, the particular monitoring relay will deenergize and the interposing control relays will also deenergize, causing the machine or process to be disabled. A reset circuit prevents continued operation of the control system as long as the ground fault condition exists.

20 Claims, 5 Drawing Sheets

GROUND FAULT DETECTION CIRCUIT FOR AN UNGROUNDED CONTROL SYSTEM

DESCRIPTION

1. Technical Field

Applicants invention relates generally to electrical control mechanisms and more particularly to a method of detecting a ground fault on an ungrounded system comprising a series of interlock switches used to control the operation of safety circuits and other types of interlock control systems.

2. Background Art

Safety circuits and interlock control systems that control the operation of various types of machinery are well known. In most instances, these interlock systems are required to be hardwired, electromechanical, and self-checking. The interlocks typically consist of a number of normally closed contacts connected in series to energize a control relay. These interlocks include, but are not limited to emergency stop push buttons, limit switches, open door indicators, palm switches, and so on. As long as the interlocks are closed, the relay remains energized and the machine can operate. Opening any one of the interlocks causes the relay to deenergize and the machine is shut down. There will be at least one emergency stop push button which will stop all machine operation without creating other hazards. If a machine is stopped because of the opening of one of the interlocks, restarting the machine can only be through a deliberate action of a machine operator. Resetting the open interlock can not restart any part of the machine. This is to prevent unexpected starting or motion of the machine being controlled.

The Occupational and Safety Health Act (OSHA) requires that all clutch and brake controls of mechanical power presses shall be protected from an accidental ground in the control circuit that could cause a false operation of the press. These grounds could be caused by broken or frayed wires, improper installation, faulty switches, and so on.

Safety and interlock circuits must function at all times. If an operator activates an emergency stop push-button, the interlock control circuit must react and cause the machine under control to shut down. However, a ground fault in the control circuit could prevent sensing operation of the stop push button. The automotive industry, as well as other manufacturers, will power these circuits with an ungrounded power source. This will allow operation of a machine with a single ground fault. With an ungrounded system, it is possible that this ground fault can be ignored, to allow a production line to continue operating. A second ground fault could prevent the interlock circuits from functioning properly. Ground fault lights are usually employed to indicate a ground fault to the personnel operating the machine. Short circuit fuses or circuit breakers will protect the control circuits from excessive currents when the ground fault occurs. This will remove power from the indicating lights and the machine operator or electrician has no visual indication to show that the ground fault has been removed.

Ground fault detectors can be purchased as separate units to provide a monitoring function on the interlock control circuits. These are often expensive and customized units. It would be more desirable to develop a control circuit that utilizes common components that overcomes the loss of a visual indication of a ground fault in the interlock control circuits when it occurs, thereby allowing continuous operation of the production line while troubleshooting and repairing the ground fault. The present invention provides a control system that addresses these and other problems.

SUMMARY OF THE INVENTION

Accordingly, an object of the present invention is to provide a hard-wired ground fault detection circuit for monitoring an interlock control circuit. The interlock control system utilizes electromechanical relays with hard contacts and is used to control operation of a machine or process.

Another object of the invention is to provide a method of indicating a ground fault condition on the interlock control circuit. The interlock control system will disable operation of the machine or process if any ground fault condition exists in the interlock control circuit. A ground condition in the machine or process control circuits will be permissible.

Still another object of the invention is to provide a redundant circuit path to verify the integrity of the components in the interlock control system.

Still another object of the invention is to provide a reset circuit that will prevent operation of the machine or process if a ground fault condition exists in the interlock control system.

The above objects are achieved and the disadvantages of the prior art are overcome in part through the use of a control system that includes an ungrounded isolation transformer for supplying power to the interlock control circuit. Separate monitoring relays are interposed between each leg of the transformer and ground, as are indicating lights. The contacts of these relays are series connected with emergency-stop (e-stop) switches to energize interposing control relays. The outputs of the interposing relays are then used to energize the final control relay that controls the operation of the machine or process. If a ground fault occurs on any leg of the interlock control circuit, the particular monitoring relay will deenergize, the corresponding indicator light will turn off and the interposing control relays will also deenergize, causing the machine or process to be disabled. A reset circuit prevents continued operation of the control system as long as the ground fault condition exists.

Other features and advantages of the invention will become apparent from the following description and accompanying drawings, in which is shown a preferred embodiment of the invention.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
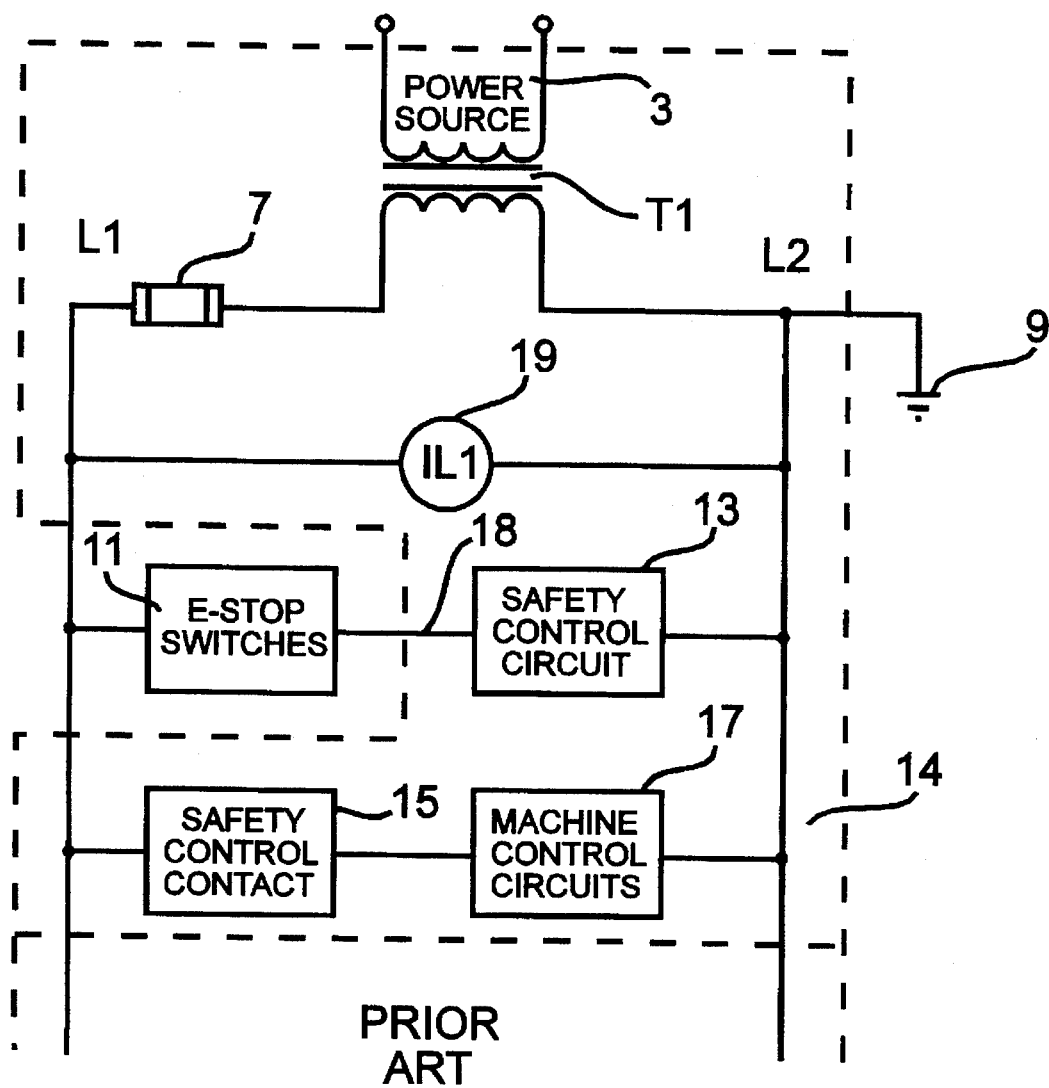
FIG. 1 is a block diagram of a typical control system using conventional series connected interlocks and safety control circuits to control a machine representative of the prior art.

Referring to FIG. 1 of the drawings, a typical interlock and safety control system 1, illustrative of prior art, is powered from a single power source 3 and has an isolation transformer 5 with one leg L2 connected to ground 9. A fuse 7 protects the other leg L1 from ground faults or overloads in the control circuits 11, 13, 15 and 17. Emergency stop (E-stop) circuits 11 contain conventional series connected interlocks to control a safety control circuit 13. The E-stop circuits are generally located outside of an enclosure 14 that houses the main components of the system. This control circuit 13 has an output contact or contacts 15 that can be used to control the operation of any type of machine or process 17. The E-stop switches include normally closed emergency stop push button contacts, door interlocks, and position indication limit switches. Other types of interlocks are also possible. As long as all the interlocks are in their normal position, the control voltage L1 is available at input 18 of the safety control circuit 13 which will allow the machine or process that it is controlling to function. If any of the interlocks 11 opens, the output contact 15 of the safety check circuit 13 will remove L1 from machine control circuits 17, stopping the operation of the machine. IL1 indicator 19 will be on as long as there is a voltage present between L1 and L2.

If an unwanted ground is introduced into the system, fuse 7 will open. Since the E-stop switches 11 are located outside the enclosure 14, they are more susceptible to unintentional grounds. These switches are hard contacts so that a ground anywhere along the series-connected switches will result in a direct short between L1 and L2, causing fuse 7 to blow open. Indicator 19 will turn off and the machine will cease to function. Although this system provides protection for ground faults, the operator or maintenance personnel have no indication as to the cause of the shutdown and valuable production time will be lost before the situation can be corrected. This downtime can be very costly.

Figure 2:
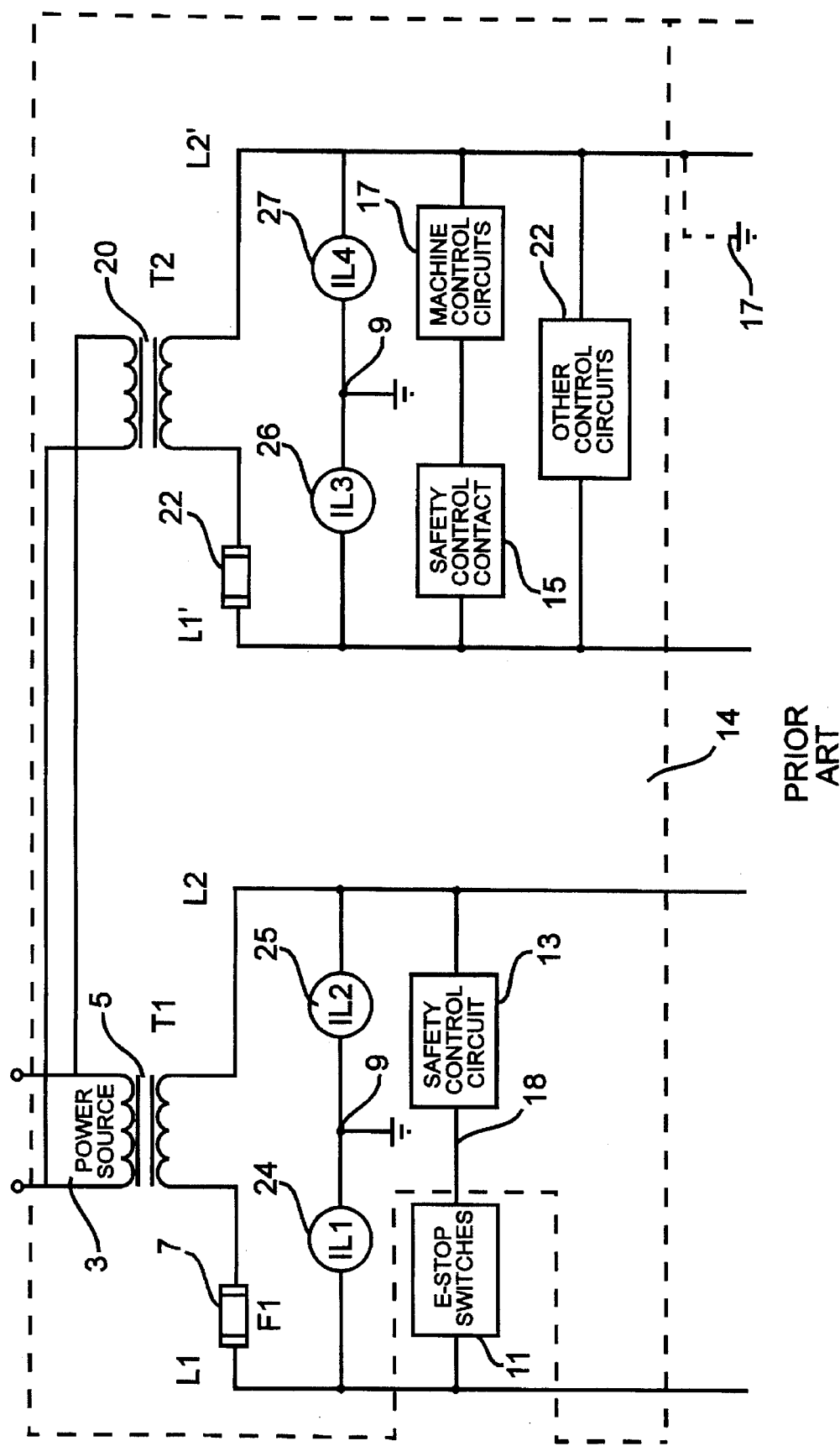
FIG. 2 is a block diagram of a typical control system using an isolated power source to power a conventional interlock check circuit and a separate power source to power a machine representative of the prior art.

An improvement of this system is illustrated in FIG. 2. The same control system as FIG. 1 is reconfigured in a manner to eliminate or reduce that potential downtime by utilizing a second transformer 20 to power the machine control circuits 17 and other control circuits 22. Power L1, L2 is isolated from power L1', L2' such that a short to ground in the E-stop circuits 11 will still cause a shutdown of the machine, but a single ground in the machine control power circuits will continue to allow operation of the machine. Two indicator lights 24, 25 will be on at half brilliance as long as neither L1 or L2 is grounded. If an unintentional ground is coupled to L2, indicator 25, will turn off. However, the output contact 15 from the safety control circuit 13 will remain energized and operation of the machine control circuits 17 will continue as if nothing has occurred. If an unintentional ground is coupled to L1 or anywhere along the series-connected switches 11, indicator 24 will turn off. The output contact 15 from the safety control circuit 13 will also remain energized and operation of the machine control circuits 17 will also continue to function. A single ground fault will not cause a system shutdown. In order for a system shutdown to occur, both L1 and L2 have to be grounded. If L2 is intentionally grounded, indicator 24 will turn off and the machine control circuits 17 will continue operating. Now if an unintentional ground is coupled to L1 or anywhere along the series-connected switches 11, a direct short will occur between L1 and L2, causing fuse 9 to blow open. Both indicators 24 and 25 will turn off and the machine will cease to function.

A ground in the machine control circuits powered from transformer 20 will result in similar indications. Two indicator lights 26, 27, as above, will be on at half brilliance as long as neither L1' or L2' is grounded. If an unintentional ground is coupled to L2', indicator 27 will turn off and operation of the machine control circuits 17 will continue as if nothing has occurred. If an unintentional ground is coupled to L1' indicator 24 will turn off and operation of the machine control circuits 17 will also continue to function. A single ground fault will not cause a system shutdown. In order for a system shutdown to occur, both L1' and L2' have to be grounded. If L2' is intentionally grounded, indicator 27 will turn off and the machine control circuits 17 will continue operating. A second, unintentional ground has to be coupled to L1' before the machine will cease functioning due to a ground fault. When this occurs, a direct short will occur between L1' and L2', causing fuse 22 to blow open. Both indicators 26 and 27 will turn off and the machine will cease to function.

Figure 3:
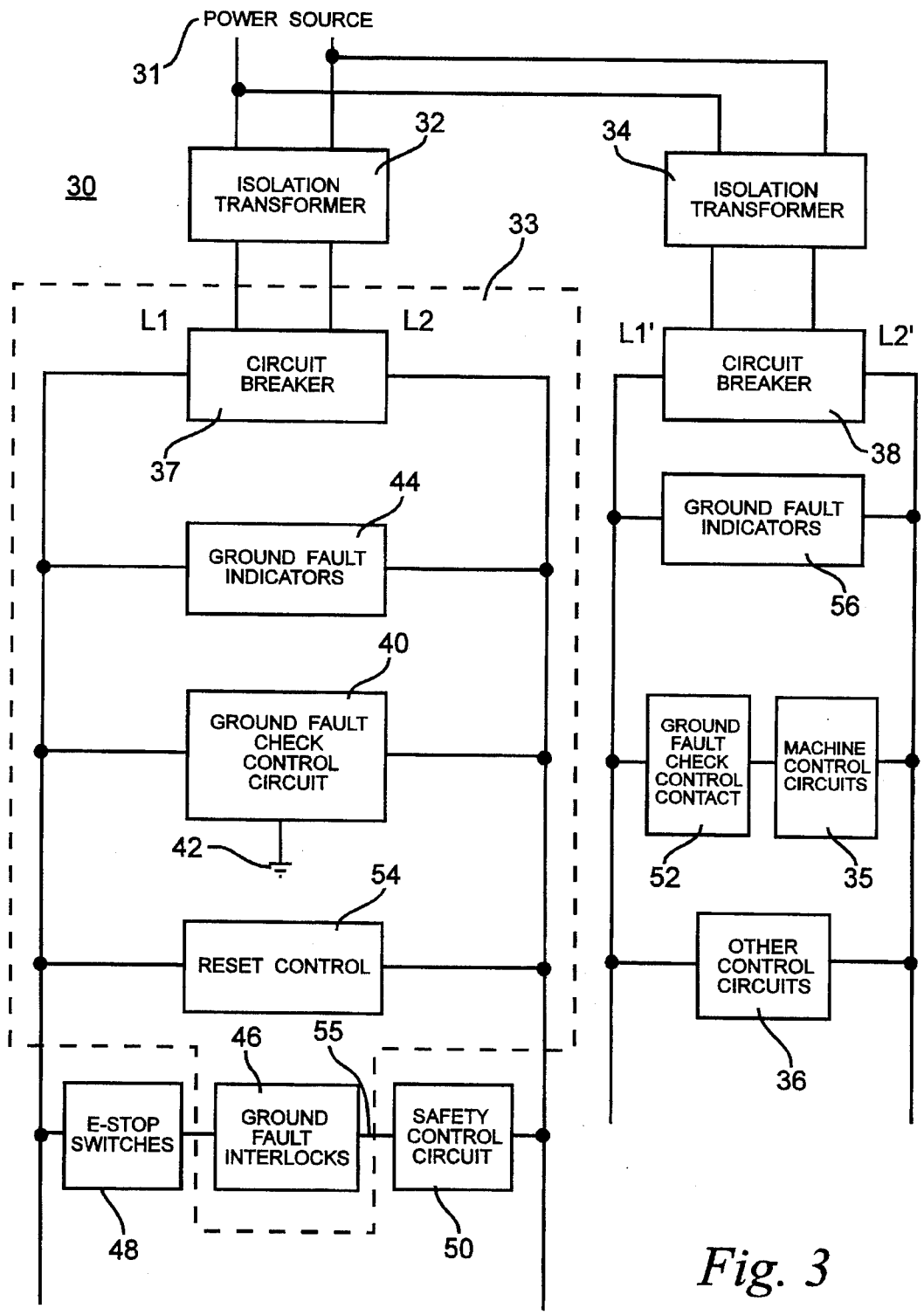
FIG. 3 is a block diagram of a control system using an isolated power source to power a ground fault check circuit and a separate power source to power a machine constructed according to the preferred embodiment.

Referring now to FIG. 3, a block diagram of a control system 30 using an isolated power source to power a ground fault check circuit and a separate power source to power machine control circuits constructed according to the preferred embodiment is disclosed. A first transformer 32 provides isolation voltages L1–L2 from a power source 31 to power a ground fault check circuit 33. A separate transformer 34 supplies L1' and L2' to power machine control circuits 35 and other control circuits 36. A circuit breaker 37 protects both legs L1, L2 from ground faults or overloads in the ground fault check circuit 33. An optional circuit breaker 38 provides protection for the machine control circuits 35.

A ground fault check control circuit 40, which has a ground connection 42, monitors both L1 and L2 for any ground connections. As long as no grounds are present, ground fault indicators 44 will be on and ground fault interlocks 46 will be energized to provide a closed circuit between E-stop switches 48 and safety control circuit 50. The E-stop switches 48, as previously described, are generally located outside of an enclosure that houses the main components of the system. The ground fault check control circuit 40 has an output contact or contacts 52 that can be used to control the operation of the machine control circuits 35. As long as all the interlocks 46 are in their normal position and there are no grounds present in either the ground fault check circuits 33 or E-stop circuits 48, control voltage L1 is available at input 54 of the safety control circuit 50. This will allow the machine or process that it is controlling to function. If any of the interlocks 46 opens, the ground fault check control contact 52 will remove L1' from the machine control circuits 35, which would stop the operation of the machine or process being controlled. If a ground is introduced into either L1 or L2, the safety control circuit 50 will also deenergize, opening the ground fault check control contact 52 which would also stop the operation of the machine or process being controlled. Under these conditions, the ground fault indicators would provide a visual indication as to which leg, L1 or L2, has the ground fault. However, if both L1 and L2 are grounded, the circuit breaker 37 would trip and no visual indication would be possible. Once the ground fault condition has been corrected, reset control 54 will allow restarting the ground fault check circuits 33.

A single ground in the machine control power circuits 35 will continue to allow operation of the machine. Ground fault indicator 56 will be on as long as neither L1' or L2' is grounded. If an unintentional ground is coupled to either L1' or L2', the output contact 52 from the ground fault check circuit 33 will remain energized and operation of the machine control circuits 35 will continue as if nothing has occurred. If an unintentional ground is coupled to either L1 or L2 or anywhere along the series-connected E-stop switches 48, the machine will cease to function.

Figure 4:
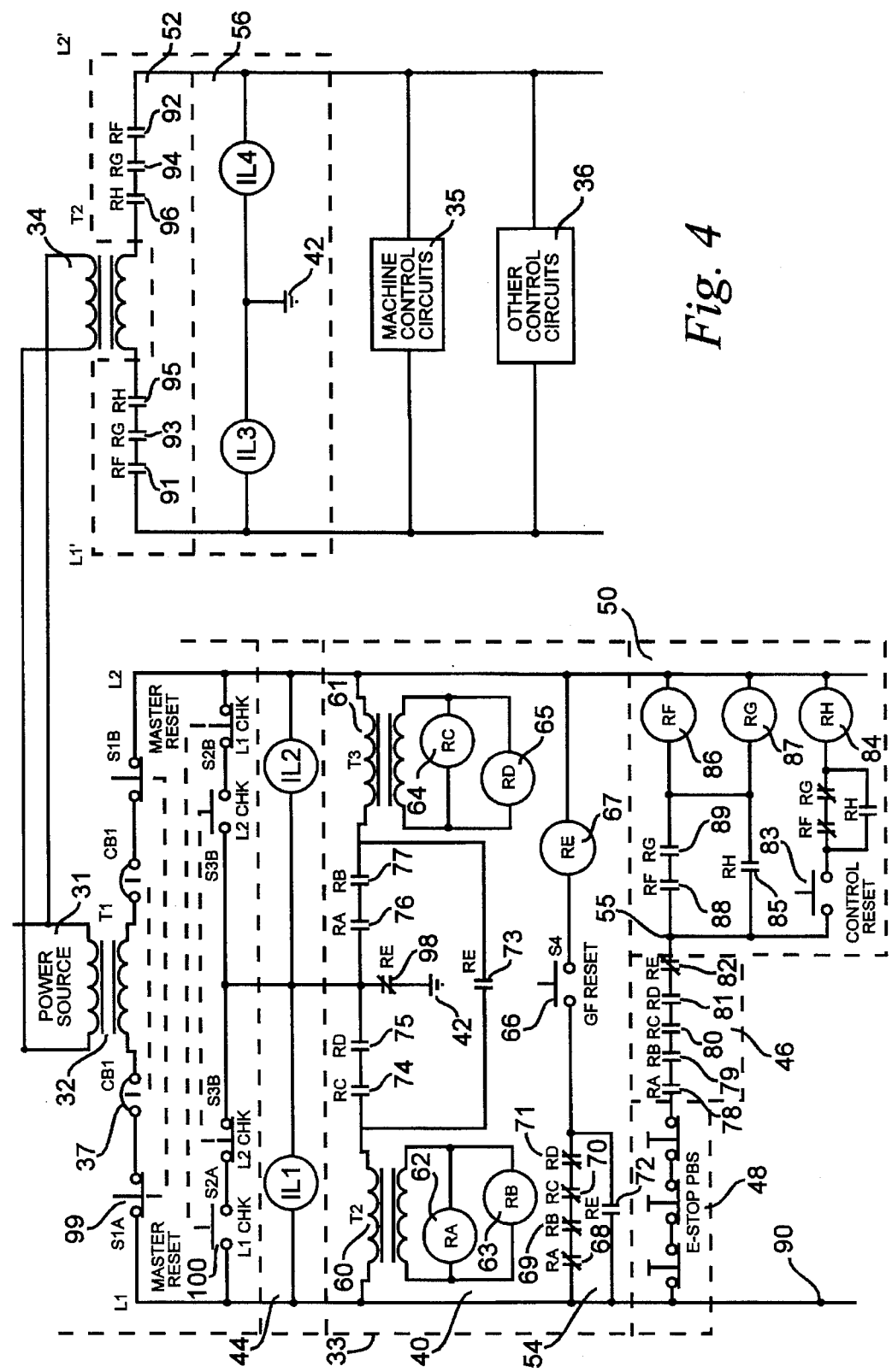
FIG. 4 is a detailed schematic diagram for the control system disclosed in FIG. 3 constructed according to the preferred embodiment.

Operation of the ground fault check circuits can be best understood with reference to FIG. 4 which is a detailed schematic diagram of the block diagram of FIG. 3. Incoming power 31 is coupled to transformers 32 and 34 to supply power to the ground fault check circuits 33 and the machine control power circuits 35, respectively. The ground fault check control circuit 40 monitors L1 for ground faults through the voltage developed across transformer 60. Similarly, transformer 61 monitors L2 for ground faults. For the present invention, transformers 60, 61 have primary windings rated at 60 VAC and secondary windings rated at 120 VAC. Other voltage ratings are possible and the present ratings are not meant to be restrictive. Coils of relays 62, 63 are connected to the secondary of transformer 60 and coils of relays 64, 65 are connected to the secondary of transformer 61. Upon the application of power 31 to transformer 32, and before ground fault reset switch 66 is depressed, relays 62-65 are deenergized. It should be recognized that relays 62 and 64 have redundant relays 63, 65 respectively. This is to increase circuit reliability in the unlikely event that one of these relays has a failure. L1, L2 voltage is applied to ground fault indicators 44 designated as IL1 and IL2, which will provide a visual indication that voltage is present on the ground fault check circuits 33. L1 voltage is coupled to the coil of relay 67 through a set of series connected normally-closed (NC) contacts 68-71 of relays 62-65. A normally-open (NO) holding contact 72 allows relay 67 to temporarily remain energized.

A separate NO contact 73 of relay 67 provides a complete circuit for a series connection of the primaries of transformers 60, 61. With 120 VAC between L1 and L2, each transformer 60, 61 will see 60 VAC, providing 120 VAC in the secondary windings. This will, in turn, provide voltage to energize relays 62-65. With these relays energized, NO contacts 74-77 close to provide an alternate connection between transformers 60, 61. Releasing the ground fault reset switch 66 causes relay 67 to deenergize. This will establish a ground reference 42 at the common connection between transformers 60, 61, and between ground fault indicators 44. Another set of NO contacts 78-81 of relays 62-65 and a NC contact 82 of relay 67 are series connected to control L1 applied to node 55, which is the input to the safety control circuit 50. If there are no ground faults present and all E-stop switches 48 and other interlocks are closed, operating control reset switch 83 will momentarily energize RH relay 84. NO contact 85 will then energize relays 86 and 87, which are then latched by NO contacts 88 and 89 after the control reset switch 83 is released. Relay 86 has redundant relay 87 to increase circuit reliability in the unlikely event that one of these relays has a failure. Although safety control circuit 50 is shown thusly, it must be recognized that the object of the present invention is to provide ground fault interlocks 46 for connecting in series with E-stop switches 48 for inputting to any type of safety control circuits or interlock control circuits. At this point, the ground fault check circuits 33 are in a normal operating mode. NO contacts 91-94 from relays 86 and 87 and NC contacts 95-96 from relay 84 provide voltage L1'-L2' to the machine control power circuits 35 and other control circuits 36 as long as there are no ground faults in the safety and interlock control circuits. When a ground fault does occur, relays 86 and 87 will deenergize, removing power L1'-L2' from the machine control power circuits 35.

To illustrate this occurrence, assume that a ground fault is introduced at point 90. This will effectively remove voltage from the primary of transformer 60 since ground 42 is present at the other leg of the primary winding through contacts 74, 75 and 98, causing relays 62 and 63 to deenergize. NO contacts 78-79 will open and relays 86 and 87 will also deenergize, removing power L1'-L2' from the machine control power circuits 35 via contacts 91-94 opening. To prevent transformer 61 from failure due to overvoltage on its primary winding, NO contacts 76-77 of relays 62, 63 will remove voltage from the transformer 61. Indicator IL1 will turn-off to indicate that the ground fault is in the L1 leg. Indicator IL2 will remain on since there is a circuit path between L2 and ground 42 through the NC contact 98.

If a ground fault occurs on the L2 leg, voltage from the primary of transformer 61 will be removed since ground 42 is present at the other leg of the primary winding through contacts 76, 77 and 98, causing relays 64 and 65 to deenergize. NO contacts 80-81 will open and relays 86 and 87 will also deenergize, removing power L1'-L2' from the machine control power circuits 35 via contacts 91-94 opening, as before. To prevent transformer 60 from failure due to overvoltage on its primary winding, NO contacts 74-75 of relays 64 and 65 will remove voltage from the transformer 60. Indicator IL2 will turn-off to indicate that the ground fault is in the L2 leg. Indicator IL1 will remain on since there is a circuit path between L1 and ground 42 through the NC contact 98.

The preferred embodiment will display ground fault status by means of indicators IL1 and IL2 if a ground fault is present in either L1 or L2, and at the same time, disable the machine control circuits 35. The indicator of the ungrounded leg will remain on since there is a circuit path between the leg and ground 42 through the NC contact 98. This will allow for troubleshooting and correcting the fault condition. The circuits can only be reset only when both indicators IL1 and IL2 are on, albeit at half brilliance. In the prior art, troubleshooting is mostly a hit and miss situation, with no indication of when a ground has been found and removed.

If a ground fault should occur on both L1 and L2, circuit breaker 37 will trip to prevent short circuit currents from damaging the circuitry. A master reset switch 99 provides a means of resetting the ground fault check circuits 33 without having to remove power 31 from the system. Switches L1 CHK 100 and L2 CHK 102 allow an operator to verify operation of the ground fault check circuits 33 by manually introducing a ground 42 on either L1 or L2 through the NC contact 98 of relay 67.

Relay contact 98 of relay 67 will also prevent an unintentional overvoltage condition on relay coils 64 and 65 if the L1 leg or on relay coils 62 and 63 if the L2 leg has an unintentional ground when GF reset switch 66 is depressed. When energized, relay contact 98 removes ground from the effected transformer, which would see 120 VAC instead of the normal 60 VAC on its primary winding, resulting in 240 VAC across the corresponding relay coils in the secondary winding circuits.

Figure 5:
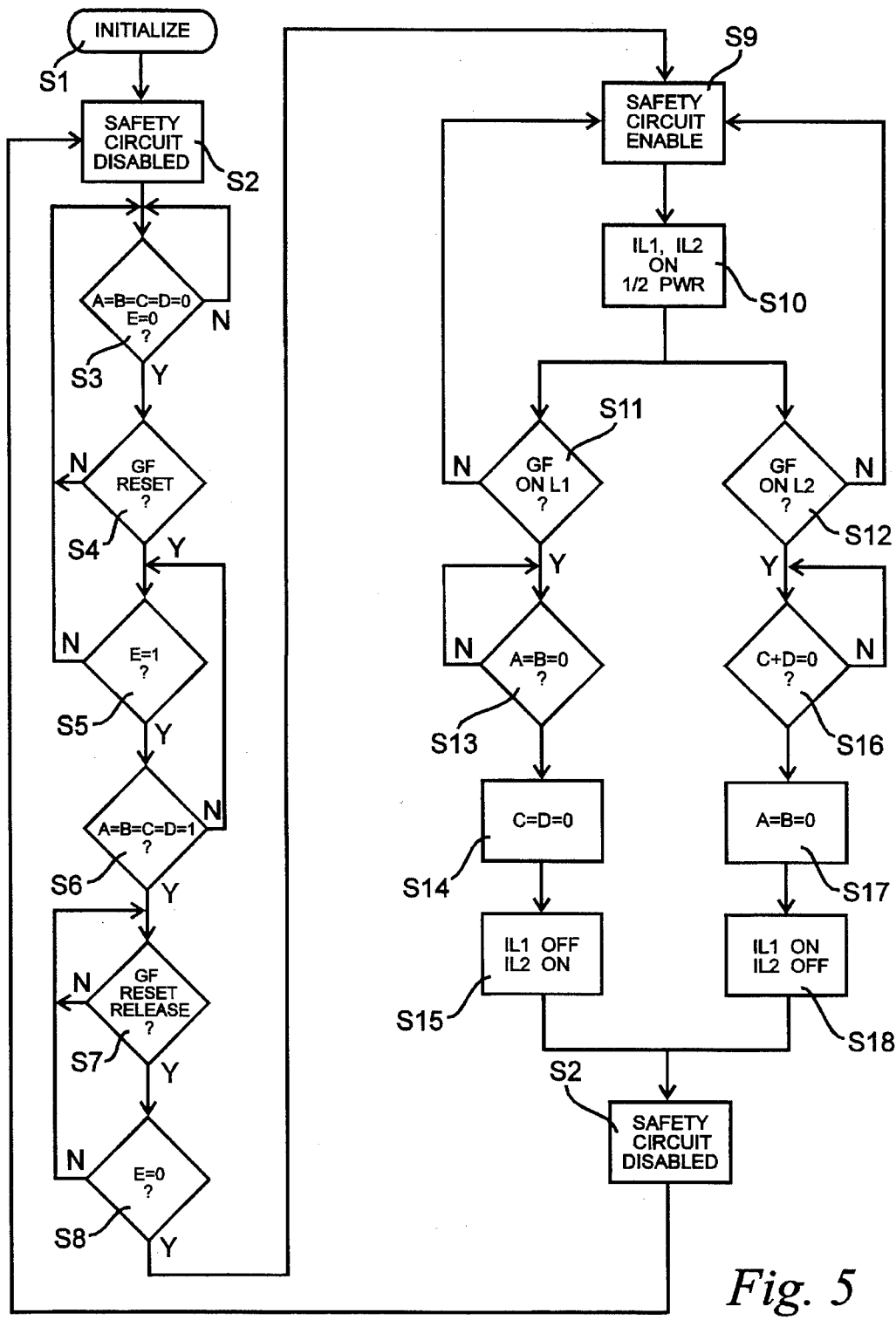
FIG. 5 is a flow diagram for operation of the control system disclosed in FIG. 3 constructed according to the preferred embodiment.

The flow diagram of FIG. 5 provides an overview of the operation of the ground fault check circuit 33 constructed according to the preferred embodiment. For simplicity, the letters A–E represent relays 62–65 and 67 respectively, of FIG. 4. Therefore, at step S1, the circuits are initialized, either by applying power 31 or depressing the master reset switch 99. At this time S2, the safety circuit is disabled. All relays are deenergized, i.e., A=B=C=D=E=0. The ground fault check circuits 33 will not allow the system to proceed any further if this is not the case at step S3. This is to check for possible welded relay contacts or possible grounds in the circuits. If the relays are all deenergized, the system will wait for the ground fault reset switch 66 to be depressed S4. This will cause relay 67 to energize, E=1, at step S5. Again, the system verifies that this has occurred before proceeding to step S6 whereby relays 62–65 are energized, A=B=C=D=1. The ground fault check circuits 33 will not allow the system to proceed any further if this is not the case at step S6. This is to check for possible welded relay contacts, defective relays or possible grounds in the circuits. After the ground fault reset switch 66 is released at S7, relay 67 deenergizes and E=0. This will enable the safety circuits at step S9 and indicators IL1 and IL2 will illuminate at step S10. Since IL1 and IL2 are connected in series, they will be on at half intensity. If relay 67 does not deenergize, due to any number of reasons, the safety control circuits 50 will not be enabled.

The ground fault check circuit 33 will check for ground faults on L1 and L2 simultaneously at steps S11 and S12. As long as there are no grounds present, the safety circuits will continue to be enabled S9 and the machine or process being controlled will continue to operate. If there is a ground fault in the L1 leg, relays 62–63 will deenergize, A=B=0, at step S13, which will also deenergize relays 64–65, C=D=0 at step S14. Indicator IL1 will turn off and IL2 will remain on at step S15. The safety circuit will become disabled and will remain in this state until the ground fault is cleared and the ground fault reset switch 66 is depressed. The same situation will result if there is a ground fault in the L2 leg. Relays 64–65 will deenergize, C=D=0, at step S16, which will also deenergize relays 62–63, A=B=0 at step S17. Indicator IL2 will turn off and IL1 will remain on at step S18. The safety circuit will become disabled and will remain in this state until the ground fault is cleared and the ground fault reset switch 66 is depressed.

While the specific embodiments have been illustrated and described, numerous modifications are possible without departing from the scope or spirit of the invention. The present examples and embodiments are to be considered in all respects as illustrative and not restrictive, and the invention is not to be limited to the details herein given. For example, various combinations of ground fault interlocks can be used for controlling any type of control system and are not restricted to just safety or emergency stop circuits.

I claim:

1. A ground fault detection circuit for monitoring an ungrounded control system having first and second circuit legs, said ground fault detection circuit comprising:
   A. a first transformer having a primary winding coupled between said first circuit leg and a first node;
   B. a second transformer having a primary winding coupled between said second circuit leg and said first node;
   C. a reset means for initializing said ground fault detection circuit, said reset means for grounding said first node;
   D. a first detection means coupled to said first transformer for determining if a ground condition exists on said first circuit leg;
   E. a second detection means coupled to said second transformer for determining if a ground condition exists on said second circuit leg;
   F. an output, said output responsive to said first detection means and said second detection means;
   G. wherein said output is a closed circuit if no ground exists on said first and second circuit legs; and
   H. wherein said output is an open circuit if any ground exists on said first and second circuit legs.

2. The ground fault detection circuit of claim 1 further including a first indicator coupled between said first circuit leg and said first node and a second indicator coupled between said second circuit leg and said first node, said first and second indicators means for displaying if said first and second legs are ungrounded.

3. The ground fault detection circuit of claim 1 wherein said first detection means includes a first relay coupled to a secondary winding of said first transformer, said first relay energized if a ground condition does not exist and deenergized if a ground condition does exist on said first circuit leg, and wherein said second detection means includes a second relay coupled to a secondary winding of said second transformer, said second relay energized if a ground condition does not exist and deenergized if a ground condition does exist on said second circuit leg.

4. The ground fault detection circuit of claim 3 wherein said coupling of said primary winding of said first transformer to said first node includes a first NO contact of said second relay, said first NO contact to deenergize said first relay if a ground is detected on said second circuit leg and wherein said coupling of said primary winding of said second transformer to said first node includes a first NO contact of said first relay, said first NO contact to deenergize said second relay if a ground is detected on said first circuit leg.

5. The ground fault detection circuit of claim 3 wherein said reset means includes first normally-closed (NC) contacts of said first and second relays coupled in a series connection with a reset switch between said first circuit leg and a reset relay further coupled to said second circuit leg, said reset relay having a first NC contact for coupling said ground to said first diode, and a first normally-open (NO) contact for coupling said first transformer and said second transformer directly, bypassing said first node when said reset switch is operated, said reset means for initially energizing said first and second relays whereby said first NO contacts of said first and second relays couple said first and second transformers to said first node after said reset switch is released.

6. The ground fault detection circuit of claim 4 wherein said output includes first NO contacts of said first relay and first NO contacts of said second relay coupled in a series connection with a second NC contact of said reset relay, said output is a closed circuit if no ground condition exists on either of said first and second circuit legs whereby said first and second relays are energized and said reset relay is deenergized.

7. The ground fault detection circuit of claim 6 wherein said output is an open circuit if a ground condition exists on either of said first and second circuit legs whereby said first and second relays are deenergized and said reset relay is deenergized.

8. The ground fault detection circuit of claim 6 wherein said reset means is not functional as long as said ground condition exists on either of said first and second circuit legs.

9. The ground fault detection circuit of claim 6 wherein said first relay includes a redundant relay having corresponding contacts coupled in parallel with said first and second NO contacts and said first NC contact and said second relay includes a redundant relay having corresponding contacts coupled in parallel with said first and second NO contacts and said first NC contact.

10. The ground fault detection circuit of claim 1 wherein said ungrounded control system includes series connected interlocks, said interlocks for connecting to said output to control operation of a separate control system, whereby said separate control system inoperative if a ground condition exists on said series connected interlocks.

11. The ground fault detection circuit of claim 1 further including means for self-testing for a ground condition on either of said first and second circuit legs, wherein said self-testing includes means for short-circuiting said primary winding of either of said first and second transformers to cause deenergization of either of said first and second relays.

12. A control system for detecting grounds in an ungrounded control system having first and second circuit legs, said control system comprising:
   A. first and second transformers having primary windings coupled in a series connection between said first circuit leg and said second circuit leg, said first and second transformers having a first coupling means for said series connection;
   B. first detection means coupled to said first transformer for determining if a ground condition exists on said first circuit leg;
   C. second detection means coupled to said second transformer for determining if a ground condition exists on said second circuit leg;
   D. an output responsive to said first detection means and said second detection means, said output a closed circuit if no ground exists on said first and second circuit legs, said output an open circuit if any ground exists on said first and second circuit legs; and
   E. wherein said output for coupling in series with a system of interlocks for controlling operation of a separate control system whereby said separate control system operative if no ground conditions exist in said system of interlocks or said control system.

13. The control system of claim 12 further including a first indicator coupled between said first circuit leg and a first node and a second indicator coupled between said second circuit leg and said first node, said first and second indicators means for displaying if said first and second legs are ungrounded.

14. The control system of claim 12 wherein said first detection means includes a first relay coupled to a secondary winding of said first transformer, said first relay energized if a ground condition does not exist and deenergized if a ground condition does exist on said first circuit leg, and wherein said second detection means includes a second relay coupled to a secondary winding of said second transformer, said second relay energized if a ground condition does not exist and deenergized if a ground condition does exist on said second circuit leg.

15. The control system of claim 14 further including a reset means having a first normally-closed (NC) contacts of said first and second relays coupled in a series connection with a reset switch between said first circuit leg and a reset relay further coupled to said second circuit leg, said reset relay having a first NC contact for coupling a ground to said first node, and a first normally-open (NO) contact for coupling said first transformer and said second transformer directly, bypassing said first coupling means when said reset switch is operated, said reset means for initially energizing said first and second relays whereby said first NO contacts of said first and second relays comprise said first coupling means of said first and second transformers.

16. The control system of claim 15 wherein said output includes first NO contacts of said first relay and first NO contacts of said second relay coupled in a series connection with a second NC contact of said reset relay, said output is a closed circuit if no ground condition exists on either of said first and second circuit legs whereby said first and second relays are energized and said reset relay is deenergized.

17. The control system of claim 16 wherein said output is an open circuit if a ground condition exists on either of said first and second circuit legs whereby said first and second relays are deenergized and said reset relay is deenergized.

18. The control system of claim 16 wherein said reset means is not functional as long as said ground condition exists on either of said first and second circuit legs.

19. The control system of claim 16 wherein said first relay includes a redundant relay having corresponding contacts coupled in parallel with said first and second NO contacts and said first NC contact and said second relay includes a redundant relay having corresponding contacts coupled in parallel with said first and second NO contacts and said first NC contact.

20. The control system of claim 12 further including means for self-testing for a ground condition on either of said first and second circuit legs, wherein said self-testing includes means for short-circuiting said primary winding of either of said first and second transformers to cause deenergization of either of said first and second relays.

* * * * *